United States Patent [19]
Bieri

[11] 3,977,313
[45] Aug. 31, 1976

[54] BREWING CONTAINER FOR A BEVERAGE BREWING MACHINE

[75] Inventor: Karl Bieri, Zurich, Switzerland

[73] Assignee: Hagezet-Aktiengesellschaft, Zurich, Switzerland

[22] Filed: Oct. 1, 1975

[21] Appl. No.: 618,384

[30] Foreign Application Priority Data
Oct. 2, 1974 Switzerland.................. 13269/74

[52] U.S. Cl.......................... 99/297; 99/289 R
[51] Int. Cl.²................................. A47J 31/00
[58] Field of Search............ 99/297, 279, 280–281, 99/289, 319

[56] References Cited
UNITED STATES PATENTS

| | | |
|---|---|---|
| 411,037 | 9/1889 | Jones...................................... 99/280 |
| 1,699,303 | 1/1929 | Mennicke............................. 99/297 |
| 1,705,908 | 3/1929 | DeWitt............................ 99/297 UX |
| 2,324,195 | 7/1943 | Carlson et al.................. 99/319 UX |
| 2,422,580 | 6/1947 | Meier................................. 99/281 X |
| 2,846,938 | 8/1958 | Brandl................................... 99/281 |
| 2,943,556 | 7/1960 | Egi et al................................ 99/289 |
| 3,371,591 | 3/1968 | Vandenburgh III............... 99/297 X |
| 3,872,782 | 3/1975 | Egi........................................ 99/289 |

Primary Examiner—Stanley N. Gilreath
Assistant Examiner—Arthur O. Henderson
Attorney, Agent, or Firm—Darby & Darby

[57] ABSTRACT

A container in which a beverage may be brewed from a ground or powdered substance comprises a sealing piston having surfaces of different sizes upon which hot water impinges during the brewing operation, thus creating a pressure differential which ensures proper sealing between the stationary body and the movable head of the container.

3 Claims, 2 Drawing Figures

BREWING CONTAINER FOR A BEVERAGE BREWING MACHINE

This invention relates to a brewing container for a beverage-brewing machine, the container comprising a body and a head, the head being provided with a hot-water inlet pipe and being slidably disposed on the body.

In connection with the known brewing containers of this kind, having a head slidable at right angles to its geometrical axis, a number of solutions have already been proposed for ensuring faultless sealing between the body and the head despite the mobility of the latter. Designs are known, for instance, in which either a special supply of hot water (cf. Austrian Pat. No. 258,508) or cold water (cf. German Published Application No. 1,454,200) is used to operate sealing pistons, or else mechanical means controlled from the outside are additionally provided (cf. Austrian Pat. No. 282,099) in order to create sufficient sealing pressure.

All of these known solutions are comparatively elaborate, and hence susceptible to breakdowns as well.

It is an object of this invention to provide a brewing container of the aforementioned kind in which it is possible to ensure sealing between the movable head and the stationary body of the container without additional mechanical operating means or hydraulic supply lines.

To this end, the brewing container according to the present invention further comprises sealing means and an axially-movable sealing piston having a top side and an underside respectively comprising differently-sized surfaces adapted to be impinged upon by the hot water, the sealing means being disposed on the side of the piston comprising the smaller of those surfaces for cooperation with other portions of the container.

Two possible embodiments of the invention will now be described in detail with reference to the accompanying drawing, in which.

Figure 1:
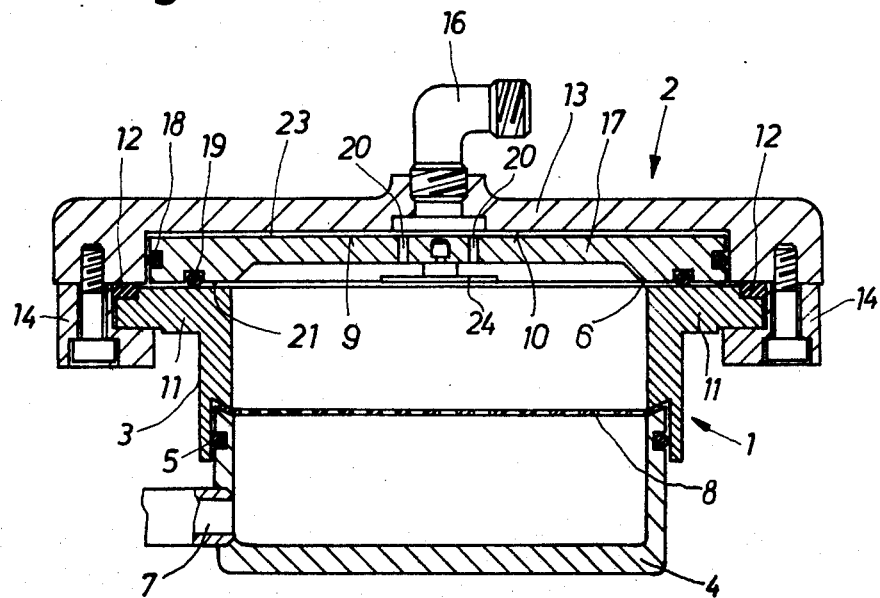
FIG. 1 is a cross-section of the first embodiment of the brewing container.

The brewing container illustrated in FIG. 1 comprises a body 1 and a head 2 slidable with respect thereto. The body 1 in turn comprises an upper part 3 and a lower part 4 which are connected to one another with a gasket 5 disposed between them. The body 1, and particularly its interior, may have a cross-section which is circular or of some other shape.

An outlet pipe 7 for the brewed beverage is attached to the lower part 4 of the brewing container. A strainer 8 is clamped between the upper part 3 and the lower part 4.

The upper part 3 of the body 1 has an outwardly-projecting flange 11, in the upper face of which glide elements 12 are inserted, made of a low-friction material such as plastic, for enabling the head 2 to slide on the body 1 with as little resistance as possible.

The head 2 comprises a cover-plate 13, screwed to the rim of which are guide members 14, gripping the edge of the flange 11, for guiding the sliding movement between the head 2 and the body 1. The cover-plate 13 has an inlet pipe 16 for the supply of hot water and, on its underside, a recess 10 in which a sealing piston, in the form of a disc-piston 17, is disposed in such a way that it is laterally encompassed by the rim of the cover-plate 13 and thus moves along with the head 2. The disc-piston 17 rests via a sealing element 19 on the flange 11 of the upper part 3. Inserted in a lateral groove in the disc-piston 17 is a sealing ring 18, by means of which the piston 17 rests loosely against the inner wall of the recess 10. The dimensions of these latter parts are such that the piston 17 is axially movable to a certain extent within the recess 10 and is guided during this movement by its sealing ring 18 cooperating with the inner wall of the recess 10. Because the piston 17, in order to be thus movable, does not completely occupy the space within the recess 10, there remains a space 23 above it as well as a gap 21 between the upper face of the flange 11 and the underside of the bearing rim of the piston 17. Therefore, when the brewing container is filled with hot water under pressure, the disc-piston 17 has two surfaces upon which the water can impinge, viz., a lower surface 6 and an upper surface 9 of different sizes. Thus the larger upper surface 9 corresponds to the entire top side of the disc-piston 17, whereas the smaller lower surface 6 is formed by that portion of the underside of the piston 17 which is surrounded by the sealing element 19.

In the central area of the disc-portion 17 are a number of perforations 20, beneath which a water-spreader plate 24 is disposed.

The brewing container described above operates as follows: First the container head 2 is slid away from the container body 1 so that the body 1 may be filled with the ground or powdered substance from which the beverage is to be brewed. This substance fills up the space above the strainer 8. The body 1 is then covered again by sliding the head 2 back, and hot water is fed into the brewing container through the inlet pipe 16. The water passes through the perforations 20 onto the spreader plate 24, where it is deflected from its original direction of flow in such a way as to sprinkle down over the entire surface of the beverage substance contained in the body 1.

The hot water, which is under pressure, fills up the entire interior of the brewing container and thus all spaces communicating therewith, above all the gap 21 and the space 23, so that the disc-piston 17 is subjected to corresponding pressures on both of its impingement surfaces 6 and 9. Inasmuch as these surfaces are of different sizes and are also subjected to differing pressure loads, there results a downwardly-directed pressure differential emanating from the larger surface 9, whereby the sealing element 19 is compressed.

After the brewing operation has been completed, the brewed beverage flows from the strainer 8 through the outlet pipe 7 and thus out of the brewing container.

Figure 2:
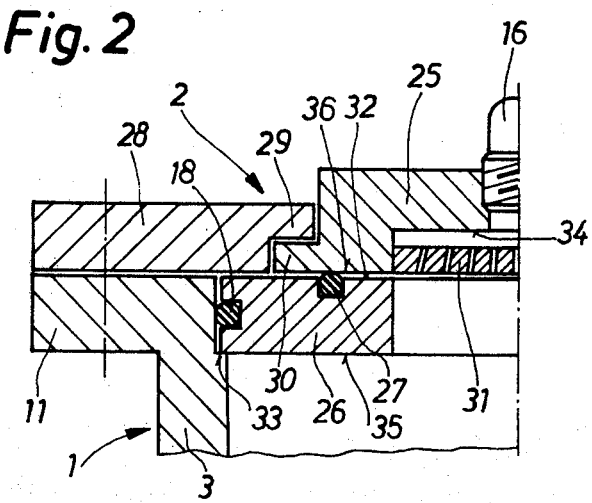
FIG. 2 is a partial cross-section of the second embodiment of the brewing container.

A second embodiment of the brewing container is illustrated in FIG. 2, which shows only a detail of the brewing-container; the parts thereof which are not shown correspond to those already described in connection with FIG. 1. Whereas in the first embodiment, the sealing piston takes the form of a disc-piston 17 held within the cover-plate 13 and is larger in diameter than the interior of the container body 1, the sealing piston in the second embodiment is an annular piston 26 resting inside the upper part 3 of the body 1 on a shoulder 33 of the inner wall thereof and supported against that inner wall by the sealing ring 18. A cover-plate 25, provided with the hot-water inlet pipe 16, rests via a sealing element 27 on the piston 26, thus forming a gap 32 communicating with the interior of the body 1. The cover-plate 25 also comprises on its underside a central recess 34, which in this embodiment is closed off by a spreader plate 31. The cover-plate 25 further comprises an outwardly-projecting flange 30 over which a rim 29 of a fixed guide member 28 is engaged, so that the cover-plate 25, as part of the container head 2, can be slid at right angles to its geometrical axis. Thus it is possible to open the body 1 at the top without, in this case, moving the piston 26 as well, nor is it necessary to move it for that purpose inasmuch as it is annular.

Here, too, the piston 26 comprises two surfaces, 35 and 36, which, when the body 1 is filled with hot water under pressure, are impinged upon by the water. The larger, lower surface 35 corresponds substantially to the entire underside of the annular piston 26, while the upper, smaller surface 36 is delimited by the inside diameter of the piston 26, on the one hand, and by the sealing element 27, on the other hand, and thus corresponds to the inner wall of the gap 32. In this embodiment as well, the difference in size between the two surfaces 35 and 36 results in a pressure difference, but one which is directed upwards and serves to compress the sealing element 27.

The decisive sealing means in brewing containers of this kind are those between the movable part and the stationary part, i.e., between the container head 2 and the container body 1. In the embodiments described above, these are the sealing elements 19 and 27, which are compressed by the sealing pistons 17 and 26, respectively, the compressive movement resulting solely from the fact that each piston has pressure-impingement surfaces of different sizes on its top and bottom sides. This makes it possible to produce the requisite sealing pressure between the container head and the container body without any necessity for additional supply lines or mechanical means operated from the outside.

What is claimed is:

1. A brewing container for a beverage-brewing machine, said container comprising a body and a head, said head being provided with a hot-water inlet pipe and being slidably disposed on said body, further comprising sealing means and an axially-movable sealing piston having a top side and an underside respectively comprising differently-sized surfaces adapted to be impinged upon said hot water, said sealing means being disposed on the side of said piston comprising the smaller of said surfaces for cooperation with other portions of said container.

2. A brewing container in accordance with claim 1, wherein said sealing piston is a disc-piston and said body comprises an outwardly-projecting flange, the smaller of said surfaces being situated on said underside and the larger of said surfaces on said top side of said disc-piston, further comprising a cover-plate spaced from said disc-piston and covering and laterally encompassing said larger surface, said disc-piston resting on said flange with said sealing means being interposed therebetween surrounding said smaller surface, and said space between said cover-plate and said disc-piston communicating with said inlet pipe.

3. A brewing container in accordance with claim 1, wherein said sealing piston is an annular piston disposed within said body, the smaller of said surfaces being situated on said top side and the larger of said surfaces being formed by said underside of said annular piston, further comprising a cover-plate spaced above said annular piston with said sealing means being interposed therebetween and limiting said smaller surface, said cover-plate bearing said inlet pipe, and said space between said cover-plate and said annular piston communicating with said body.

* * * * *